United States Patent
Bates

(10) Patent No.: US 9,836,244 B2
(45) Date of Patent: Dec. 5, 2017

(54) SYSTEM AND METHOD FOR RESOURCE SHARING ACROSS MULTI-CLOUD ARRAYS

(71) Applicant: EMC Corporation, Hopkinton, MA (US)

(72) Inventor: John W. Bates, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 36 days.

(21) Appl. No.: 14/269,758

(22) Filed: May 5, 2014

(65) Prior Publication Data

US 2014/0245026 A1  Aug. 28, 2014

Related U.S. Application Data

(63) Continuation of application No. 13/086,794, filed on Apr. 14, 2011, now abandoned, and a
(Continued)

(51) Int. Cl.
| | |
|---|---|
| *H04L 29/06* | (2006.01) |
| *G06F 3/06* | (2006.01) |
| *G06F 11/14* | (2006.01) |

(52) U.S. Cl.
CPC ............ *G06F 3/065* (2013.01); *G06F 3/0619* (2013.01); *G06F 3/0689* (2013.01);
(Continued)

(58) Field of Classification Search
CPC ...... G06F 3/065; G06F 3/0619; G06F 3/0689; G06F 11/1464; G06F 11/1435; G06F 2201/84; H04L 63/0457
(Continued)

(56) References Cited

U.S. PATENT DOCUMENTS

| | | |
|---|---|---|
| 6,532,479 B2 | 3/2003 | Souder et al. |
| 6,694,413 B1 | 2/2004 | Mimatsu et al. |
| (Continued) | | |

FOREIGN PATENT DOCUMENTS

EP   1349089   1/2003

OTHER PUBLICATIONS

Neeta Garimella, Understanding and exploiting snapshot technology for data protection, Part 1: Snapshot technology overview, http://www.ibm.com/developerworks/tivoli/library/t-snaptsm1/index.html.

*Primary Examiner* — John B King
(74) *Attorney, Agent, or Firm* — Krishnendu Gupta; Jason A. Reyes

(57) ABSTRACT

A system for resource sharing across multi-cloud storage arrays includes a plurality of storage arrays and a cloud array storage (CAS) application. The plurality of storage resources are distributed in one or more cloud storage arrays, and each storage resource comprises a unique object identifier that identifies location and structure of the corresponding storage resource at a given point-in-time. The cloud array storage (CAS) application manages the resource sharing process by first taking an instantaneous copy of initial data stored in a first location of a first storage resource at a given point-in-time and then distributing copies of the instantaneous copy to other storage resources in the one or more cloud storage arrays. The instantaneous copy comprises a first unique object identifier pointing to the first storage location of the initial data in the first storage resource and when the instantaneous copy is distributed to a second storage resource, the first unique object identifier is copied into a second storage location within the second storage resource and the second storage location of the second
(Continued)

storage resource is assigned a second unique object identifier.

10 Claims, 10 Drawing Sheets

Related U.S. Application Data continuation-in-part of application No. 12/695,250, filed on Jan. 28, 2010, now Pat. No. 8,762,642.

(60) Provisional application No. 61/324,819, filed on Apr. 16, 2010.

(52) U.S. Cl.
CPC ...... *G06F 11/1435* (2013.01); *G06F 11/1464* (2013.01); *H04L 63/0457* (2013.01); *G06F 2201/84* (2013.01)

(58) Field of Classification Search
USPC .................. 726/1–7; 713/150, 153, 189–190
See application file for complete search history.

(56) References Cited

U.S. PATENT DOCUMENTS

| | | | |
|---|---|---|---|
| 6,993,539 | B2 | 1/2006 | Federwisch et al. |
| 7,467,167 | B2 | 12/2008 | Patterson |
| 2003/0182301 | A1 | 9/2003 | Patterson et al. |
| 2009/0164527 | A1 | 6/2009 | Spektor et al. |
| 2009/0177718 | A1 | 7/2009 | Patterson et al. |
| 2010/0199042 | A1* | 8/2010 | Bates .................... H04L 67/289 711/114 |
| 2010/0306174 | A1* | 12/2010 | Otani .................. G06F 11/1464 707/640 |
| 2010/0318812 | A1* | 12/2010 | Auradkar ............ G06F 11/1464 713/193 |
| 2010/0333116 | A1* | 12/2010 | Prahlad ............... G06F 17/3002 719/328 |
| 2011/0167221 | A1* | 7/2011 | Pangal ................ G06F 11/1453 711/117 |

* cited by examiner

350

| Basic envelope | 350 |
| --- | --- |
| envelope descriptor | 351 |
| cloud provider | 352 |
| cloud access node * | 353 |
| cloud user * | 354 |
| cloud secret/token * | 355 |
| cloud object identifier | 356 |
| encrypted (yes/no) | 357 |
| compressed (yes/no) | 358 |
| structural encryption key (optional) | 359 |
| data encryption key (optional) | 360 |
| epoch/generation number | 361 |
| cloudarray volume identifier | 362 |
| most recent cloudarray identifier | 363 |
| user-provided description | 364 |

FIG. 5

SYSTEM AND METHOD FOR RESOURCE SHARING ACROSS MULTI-CLOUD ARRAYS

CROSS REFERENCE TO RELATED CO-PENDING APPLICATIONS

This application is a continuation of and claims the benefit of U.S. application Ser. No. 13/086,794 filed on Apr. 14, 2011 and entitled SYSTEM AND METHOD FOR RESOURCE SHARING ACROSS MULTI-CLOUD ARRAYS which is commonly assigned and the contents of which are expressly incorporated herein by reference. U.S. application Ser. No. 13/086,794 is a non-provisional of and claims the benefit of U.S. provisional application Ser. No. 61/324,819 filed on Apr. 16, 2010 and entitled SYSTEM AND METHOD FOR RESOURCE SHARING ACROSS MULTI-CLOUD ARRAYS which is commonly assigned and the contents of which are expressly incorporated herein by reference.

This application is a continuation in part of U.S. application Ser. No. 12/695,250 filed on Jan. 28, 2010 and entitled SYSTEM AND METHOD FOR SECURE AND RELIABLE MULTI-CLOUD DATA REPLICATION, which is commonly assigned and the contents of which are expressly incorporated herein by reference.

FIELD OF THE INVENTION

The present invention relates to a system and a method for resource sharing across multi-cloud arrays, and more particularly to resource sharing across multi-cloud arrays that provides secure and reliable data replication and "compute anywhere" capability.

BACKGROUND OF THE INVENTION

Cloud storage refers to providing online data storage services including database-like services, web-based storage services, network attached storage services, and synchronization services. Examples of database storage services include Amazon SimpleDB, Google App Engine and BigTable datastore, among others. Examples of web-based storage services include Amazon Simple Storage Service (Amazon S3) and Nirvanix SDN, among others. Examples of network attached storage services include MobileMe, iDisk and Nirvanix NAS, among others. Examples of synchronization services include Live Mesh, MobileMe push functions and Live Desktop component, among others.

Customers usually rent data capacity on demand over the Internet, or use local pools of inexpensive storage as a private utility, anywhere within their business. Cloud storage services are usually billed on a utility computing basis, e.g., per gigabyte per month. Cloud storage provides flexibility of storage capacity planning and reduces the storage management overhead by centralizing and outsourcing data storage administrative and infrastructure costs.

However, the benefits of cloud storage do come with some significant drawbacks. Business data are extremely critical to the operations of any business and need to be reliable, secure and available on demand. Even a minor security breach or black out in the data availability can have drastic consequences. Current Internet-based cloud storage implementations do not usually deploy security measures that are adequate to protect against even minor security breaches. Availability and reliability has also not been up to the standards of even small-to-medium size enterprises. Furthermore, cloud storage is not standards-based and businesses usually need to invest in application development in order to be able to use them. In particular, different cloud storage systems provide different interfaces and have different requirements for the data presentation and transfer. For example, Amazon S3 allows reading objects containing from 1 to 5 gigabytes of data each (extents), storing each object in a file and uploading (sending data from a local system to a remote system) only the entire file, whereas Nirvanix SDN allows writing to any extent but only downloading (receiving data to a local system from a remote system) the entire file. Continuous data replication between data stored in these two different cloud storage systems is currently unavailable.

A one time data migration process from Amazon S3 to Nirvanix SDN is described in http://www.nirvanix.com/s3migrationtool.aspx. It requires downloading and installing specialized software, is cumbersome, inefficient for continuous data replication, not reliable or secure and therefore it is currently not used at least for business storage applications.

Accordingly, there is a need for a reliable and secure multi cloud data replication solution that is secure, inexpensive, easy to use and scalable without compromising performance.

SUMMARY OF THE INVENTION

The invention provides a multi-cloud data replication system that utilizes shared storage resources for providing secure and reliable data replication and "compute anywhere" capability. Each storage resource is associated with a unique object identifier that identifies the location and structure of the corresponding storage resource at a given point-in-time within a specific cloud. Data contained in the storage resources are accessed by accessing the location and volume identified by the unique object identifier. The shared resources may be storage volumes, snapshots, among others. The shared storage resources may be located in any of the clouds included multi-cloud arrays. A cloud array storage (CAS) application manages the storage sharing processes.

In one embodiment, a "shared snapshot" is utilized to provide data replication. In the "shared snapshot" data replication model a "snapshot" of the original volume is taken and then copies of the "snapshot" are distributed to the various clouds in the multi-cloud array. This multi-cloud data replication system provides cloud storage having enterprise-level functionality, security, reliability and increased operational performance without latency. The "shared-snapshot" data replication model is also used to provide an accelerated distributed computing environment.

In general, in one aspect, the invention features a system for resource sharing across multi-cloud storage arrays including a plurality of storage arrays and a cloud array storage (CAS) application. The plurality of storage resources are distributed in one or more cloud storage arrays, and each storage resource comprises a unique object identifier that identifies location and structure of the corresponding storage resource at a given point-in-time. The cloud array storage (CAS) application manages the resource sharing process by first taking an instantaneous copy of initial data stored in a first location of a first storage resource at a given point-in-time and then distributing copies of the instantaneous copy to other storage resources in the one or more cloud storage arrays.

The instantaneous copy comprises a first unique object identifier pointing to the first storage location of the initial data in the first storage resource and when the instantaneous copy is distributed to a second storage resource, the first unique object identifier is copied into a second storage location within the second storage resource and the second storage location of the second storage resource comprises a second unique object identifier.

Implementations of this aspect of the invention may include one or more of the following features. When a user tries to "write" new data into the first storage location of the first storage resource, the new data are written into a second storage location of the first storage resource and then the second storage location of the first storage resource is assigned to the first unique object identifier. The second storage location of the first storage resource is backfilled with unchanged data from the first storage location of the first storage resource, and subsequently data in the first storage location of the first storage resource are removed. The first unique object identifier is encrypted prior to the instantaneous copy being distributed. The data in the first location of the first storage resource are compressed and encrypted after the instantaneous copy is taken and prior to the instantaneous copy being distributed. Each unique object identifier comprises one or more metadata identifying specific storage location within a specific storage resource, specific storage resource location, structure of the specific resource, type of the contained data, access control data, security data, encryption data, object descriptor, cloud storage provider, cloud storage access node, cloud storage user, cloud storage secret/token, indicator whether data are encrypted or not, indicator whether data are compressed or not, structural encryption key, data encryption key, epoch/generation number, cloud array volume identifier, user-provided description, sender identifier, recipient identifier, algorithm identifier, signature or timestamp. The system may further includes a local computing system comprising at least one computing host device, the CAS application, at least one local storage resource and at least one local cache. The local computing system connects to the one or more cloud storage arrays via the Internet. The storage resources may be storage volumes or snapshots.

In general, in another aspect, the invention features a method for resource sharing across multi-cloud storage arrays including providing a plurality of storage resources distributed in one or more cloud storage arrays and providing a cloud array storage (CAS) application for managing the resource sharing process. Each storage resource comprises a unique object identifier that identifies location and structure of the corresponding storage resource at a given point-in-time. The CAS application manages the resource sharing process by first taking an instantaneous copy of initial data stored in a first location of a first storage resource at a given point-in-time and then distributing copies of the instantaneous copy to other storage resources in the one or more cloud storage arrays. The instantaneous copy comprises a first unique object identifier pointing to the first storage location of the initial data in the first storage resource and when the instantaneous copy is distributed to a second storage resource, the first unique object identifier is copied into a second storage location within the second storage resource and the second storage location of the second storage resource comprises a second unique object identifier.

Implementations of this aspect of the invention may include one or more of the following features. The method may further include the following steps. First, receiving a write command from a computing host device for writing new data into a first storage resource. The first storage resource comprises a first unique object identifier and the first unique object identifier comprises metadata identifying a first storage location within the first storage resource, structure of the first storage resource, type of contained data, access control data and security data. Next, identifying structure of the first storage resource based on the structure metadata. Next, verifying authorization of the computing host device to write the new data into the first storage resource based on the access control metadata. Next, verifying authorization of the computing host device to write the new data into the first storage location of the first storage resource based on the access control metadata. Next, determining if a precise block for writing the new data already exists in a local cache of the first storage resource. Next, storing the new data in the precise block of the local cache, if a precise block already exists. Next, allocating a new block and storing the new data in the new block of the local cache, if a precise block does not already exists. Finally, acknowledging processing of the write command to the computing host device.

The method may further include the following steps. First, analyzing the local cache block where the new data were written to determine if the local cache block has been written before or not. If the local cache block has been written before, backfilling the local cache block with unchanged data from the first storage location and then flushing the local cache block data to a second storage location in the first storage resource. If the local cache block has not been written before, flushing the local cache block data to the second storage location in the first storage resource.

The method may further include the following steps. First, requesting authorization to perform cache flush of the data in the local cache block to one or more cloud storage arrays. Upon receiving authorization to perform cache flush, creating a copy of the local cache block data and compressing the data in the local cache block. Next, encrypting the data in the local cache block. Next, assigning a unique object identifier and a logical time stamp to the local cache block. Next, encrypting the unique object identifier of the local cache block, and then transmitting the encrypted cache block to one or more cloud storage arrays The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 5 is a block diagram of the basic envelope information;

DETAILED DESCRIPTION OF THE INVENTION

Figure 1:
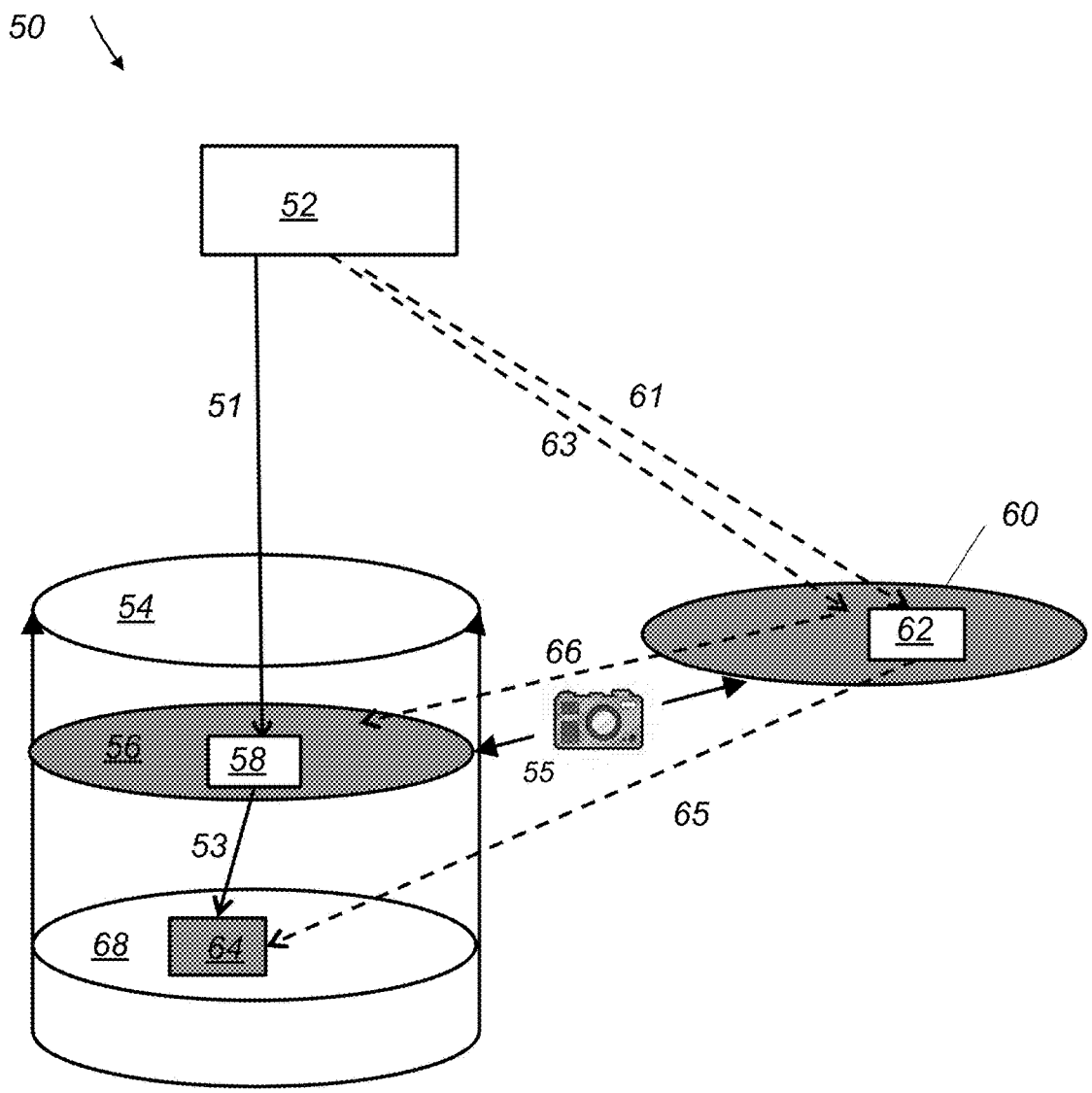
FIG. 1 is a schematic diagram of a copy-on-write snapshot implementation.

In computing systems data are usually written in computer files and stored in some kind of durable storage medium such as hard disks, compact discs (CD), zip drives, USB flash drives or magnetic media, among others. The stored data may be numbers, text characters, or image pixels. Most computers organize files in folders, directories and catalogs. The way a computer organizes, names, stores and manipulates files is globally referred to as its file system. An extent is a contiguous area of storage in a computer file system reserved for a file. File systems include in addition to the data stored in the files other bookkeeping information (or metadata) that is typically associated with each file within the file system. This bookkeeping information (metadata) includes the length of the data contained in a file, the time the file was last modified, file creation time, the time last accessed, file's device type, owner user ID and access permission settings, among others.

Computer files are protected against accidental or deliberate damage by implementing access control to the files and by backing up the content of the files. Access control refers to restricting access and implementing permissions as to who may or may not read, write, modify, delete or create files and folders. When computer files contain information that is extremely important, a back-up process is used to protect against disasters that might destroy the files. Backing up files refers to making copies of the files in a separate location so that they can be restored if something happens to the main computer, or if they are deleted accidentally. There are many ways to back up files. Files are often copied to removable media such as writable CDs or cartridge tapes. Copying files to another hard disk in the same computer protects against failure of one disk. However, if it is necessary to protect against failure or destruction of the entire computer, then copies of the files must be made on other media that can be taken away from the computer and stored in a safe, distant location. Most computer systems provide utility programs to assist in the back-up process. However, the back up process can become very time-consuming if there are many files to safeguard.

A complete data back up of a large set of data usually takes a long time. During the time the data are being backed up the users of the system may continue to write to the data files that are being backed up. This results in the backed-up data not being the same across all users and may lead to data and/or file corruption. One way to avoid this problem is to require all users to stop writing data in the data files while the back up occurs. However, this is not practical and undesirable for a multi-user group data system.

One type of data back up that can be used in cases where the writing of data cannot be interrupted is a "snapshot". A "snapshot" is defined as an instantaneous copy of a set of files and directories stored in a storage device as they are at a particular point in time. A snapshot creates a point-in-time copy of the data. A snapshot may or may not involve the actual physical copying of data bits from one storage location to another. The time and I/O needed to create a snapshot does not increase with the size of the data set, whereas the time and I/O needed for a direct backup is proportional to the size of the data set. In some systems once the initial snapshot is taken of a data set, subsequent snapshots copy the changed data only, and use a system of pointers to reference the initial snapshot. This method of pointer-based snapshots consumes less disk capacity than if the data set was repeatedly copied. In summary, a snapshot contains indicators pointing to where the initial data and changed data can be found.

Snapshots are used for data protection, data analysis, data replication and data distribution. In cases of data loss due to either data or file corruption, the data can be recovered from the snapshot, i.e., from a previous version of the volume. Program developers may test programs or run data mining utilities on snapshots. Administrators may take a snapshot of a master volume (i.e., take instant copies of a master volume) and share it with a large number of users in the system.

Snapshots usually have an operational overhead associated with whatever copy implementation is used. Increasing the number of snapshots increases the latency of the system and therefore some implementations restrict how the snapshots can be used. In some cases snapshots are read-only. Implementations that allow read-write snapshots may restrict the number of copies produced. Read-write snapshots are sometimes called branching snapshots, because they implicitly create diverging versions of their data.

Referring to FIG. 1, in a copy-on-write snapshot implementation 50, a snapshot 60 of a storage volume 56 stored in storage device 54 is created via the snapshot mechanism 55. The snapshot mechanism 55 creates a logical copy 60 of the data in storage volume 56. When the snapshot 60 is first created, only the meta-data indicating where the original data of volume 56 are stored are copied in the snapshot 60. No physical copy of the original data 56 is taken at the time of the creation of snapshot 60. A storage region 68 is set aside in the storage device 54 for future writes in the snapshot 60. Accordingly, the creation of the snapshot 60 via the snapshot mechanism 55 is instantaneous. When a user 52 tries to "write" new data (51) into block 58 of the original data 56, the original data in block 58 are first copied (53) in block 64 contained in the snapshot storage region 68 and then the new data are written in block 58 (51). Read requests to the snapshot volume of the unchanged data blocks (63) are redirected to the original storage volume 56 (66). Read requests to the snapshot volume of the changed data block 62 (61) are redirected to the copied blocks 64 in the snapshot storage region (65).

Recently, Internet based cloud storage services became available that allow data storage to online cloud storage systems. The present invention provides a data back-up system based on a sharing a snapshot of the initial data over an array of online cloud storage systems. This data back-up system utilizes the "shared snapshot" solution to provide data distribution, data analyses, data test and development, bulk loading, workflow management and disaster recovery.

Figure 2A:
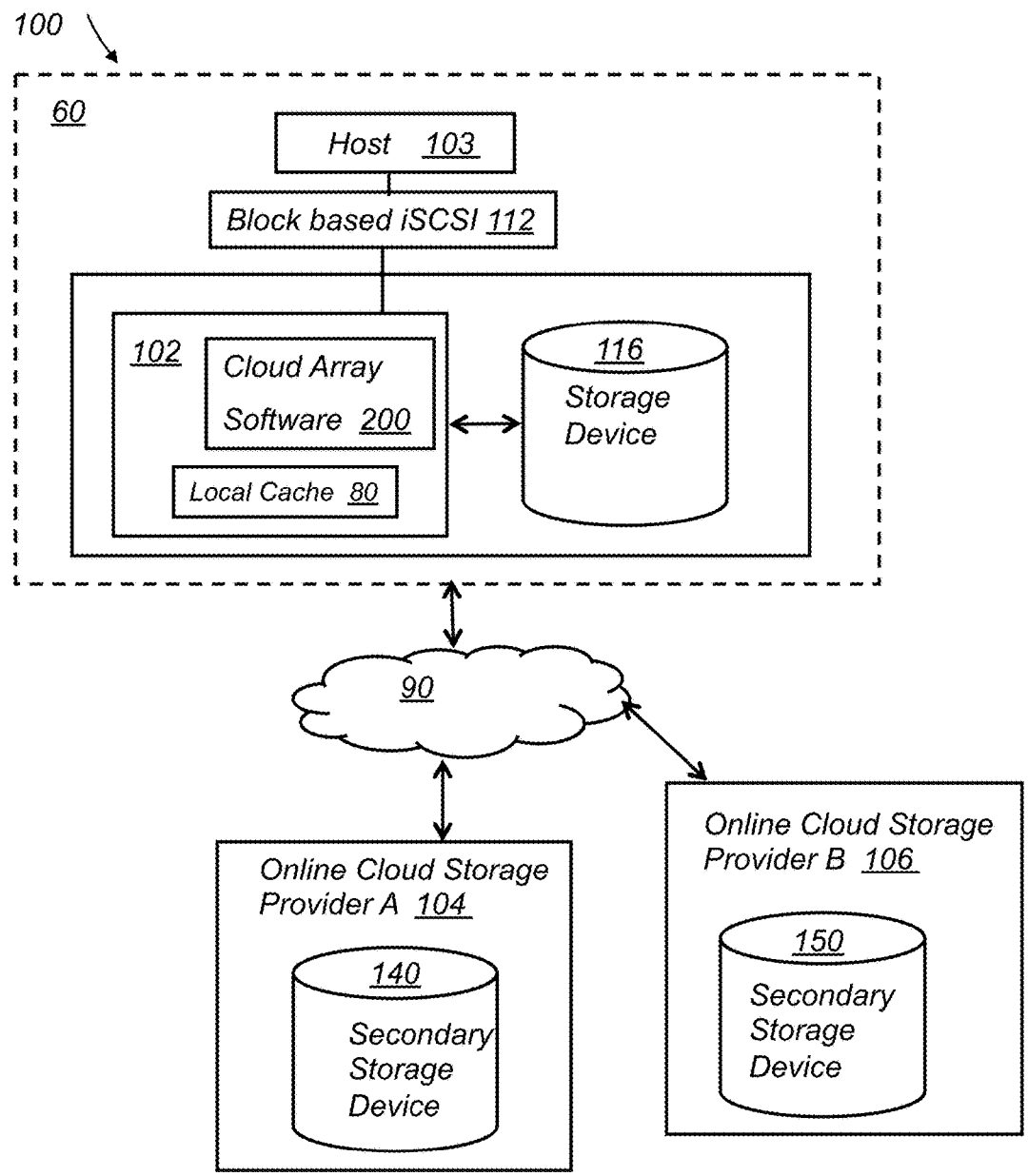
FIG. 2A is a schematic overview diagram of a single node to two-cloud array data replication system.

Referring to FIG. 2A, a multi-cloud replication system 100 includes a local computing system 60 connecting to one or more online cloud storage systems 104, 106 via Internet connection 90. The local computing system 60 includes a computing host 103, accessing a local storage device 116 via a node 102, a cloud array software (CAS) application 200 and a local cache 80. Host 103 issues read or write commands to the cache 80 and local storage device 116 via a standard block based iSCSI (Internet Small Computer System Interface) interface of the CAS 200. A SCSI interface is a set of standards for physically connecting and transferring data between computer hard disks and peripheral storage devices. The SCSI standards define commands, protocols and electrical and optical interfaces. The iSCSI protocols allow client computing devices to send SCSI commands to SCSI storage devices on remote servers via wide area IP (Internet Protocol) network connections, thereby creating a storage area network (SAN). Currently, iSCSI protocols are used by systems administrators to allow server computers to access disk volumes on storage arrays for storage consolidation to a central location and disaster recovery applications. The iSCSI protocols allow block level data input/output (I/O). A block is a sequence of bytes having a nominal length. In other embodiments, a kernel-level interface is used for writing into block-structured storage resources.

Figure 2B:
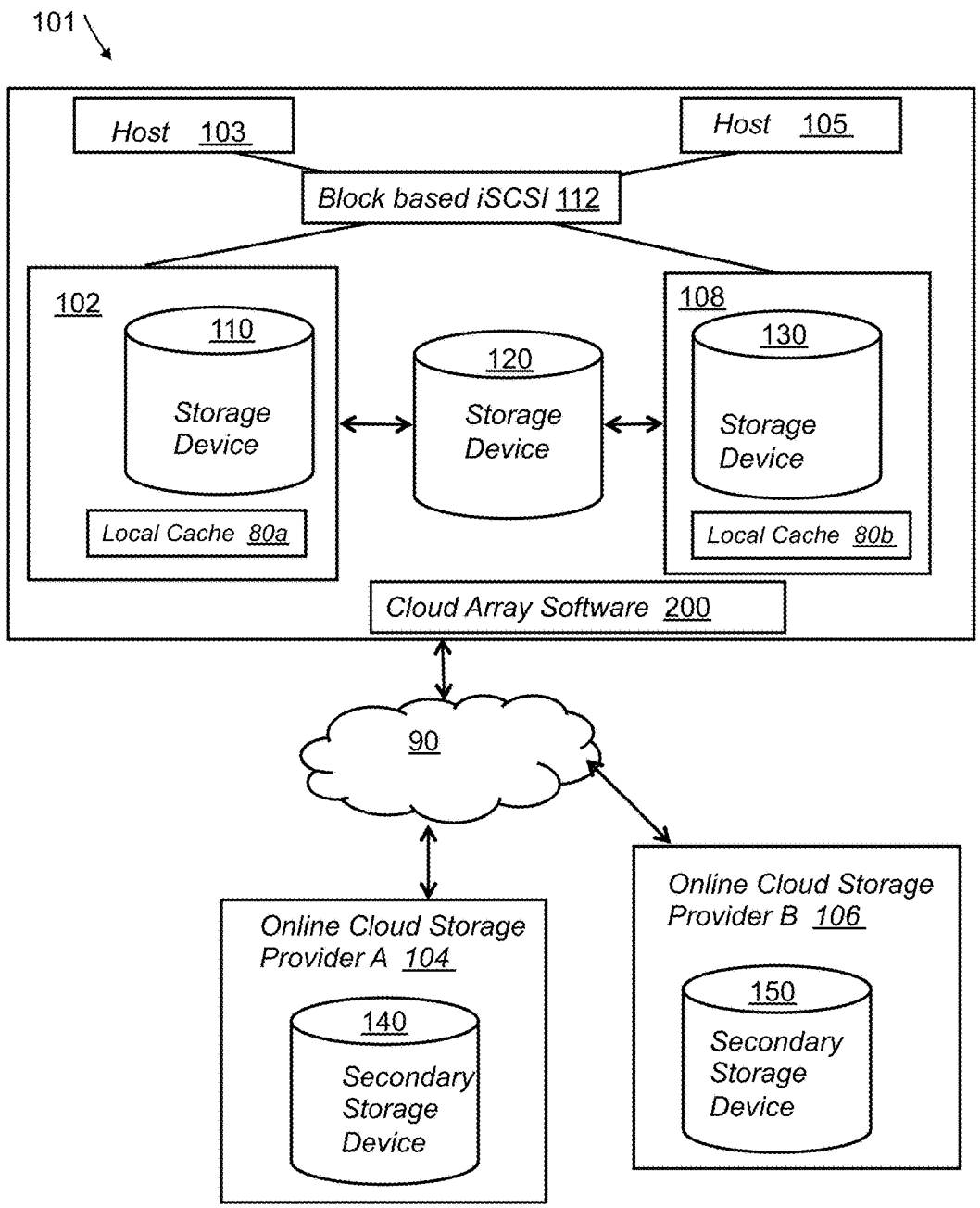
FIG. 2B is a schematic overview diagram of a two node to two-cloud array data replication system.

The cloud replication system 100 may include more than one cluster nodes. Referring to FIG. 2B, cloud replication system 101 includes nodes 102 and 108. Host 103 accesses local cache 80a and local storage device 110 in node 102 via the iSCSI interface 112 and host 105 accesses local cache 80b and local storage device 130 in node 108 also via the iSCSI interface 112. Hosts 103 and 105 also access a shared storage device 120 via the iSCSI interface 112. In both systems 100 and 101 cloud array software application (CAS) 200 provides a secure and reliable replication of data between cloud storage resources 104 and 106 and the local storage devices 110, 120, 130. Each storage resource 110, 120, 130, 140, 150 is associated with a unique object identifier that points to a specific location in the multi-cloud array. The unique object identifier also includes information (i.e., metadata) about the structure of the specific resource, the type of data contained, access control information and security requirements, among others. In one example, the unique object identifier includes a global unique identifier index (GUID), a local unique identifier (LUID) index, and security information. In the case of a catastrophic failure of the CAS 200, only a small amount of metadata is necessary to recover the entire contents of each volume. In the simplest case, all that is needed is the object identifier of the volume object 301, shown in FIG. 4. Usually, though, additional information needs to be provided in order to locate and address the volume object 301 within the appropriate cloud provider. This representation of a volume structure lends itself to using the snapshot replication model in order to perform point-in-time copies of a volume in a cloud array. Furthermore, this representation allows sharing entire volumes and the datasets contained therein across multiple disparate systems performing a wide variety of tasks, in such a way as to eliminate operational overhead between the systems. Essentially, volumes can be transferred or shared between CAS instances without either copying the data or managing access to physical or network components.

In operation, an input/output (I/O) that is received from attached hosts 103, 105 via the iSCSI interface 112, is processed in several stages, passing from the host's random access memory (RAM) to specific blocks in specific storage volumes in the local disk storage devices 110, 120, 130 and in the cloud storage devices 140, 150. At each step, every effort is made to complete the host's request as quickly as possible, while still maintaining correctness and reliability.

Figure 3A:
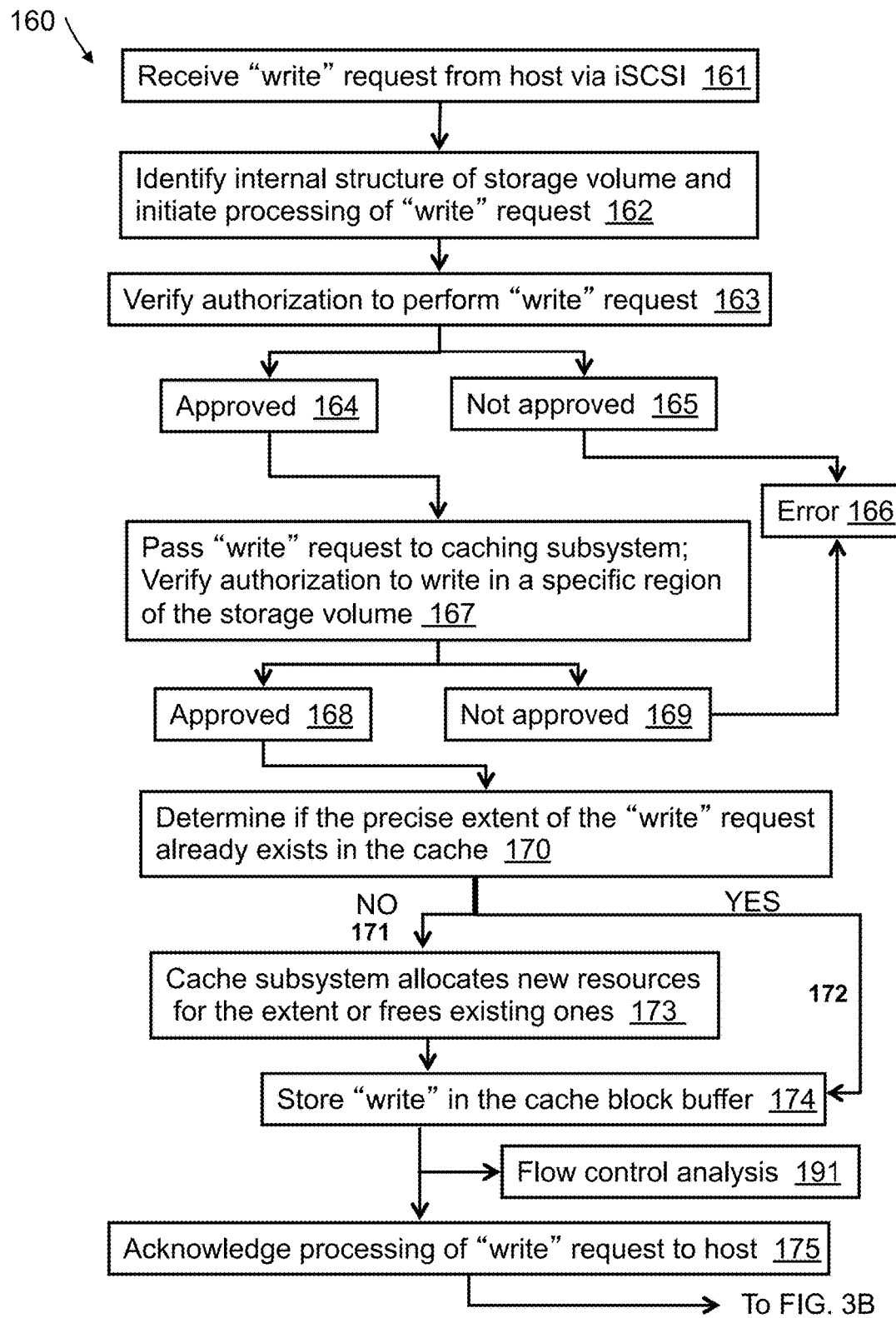
FIG. 3A-FIG. 3C are flow diagrams of the data I/O requests in a multi cloud data replication system.
Figure 3B:
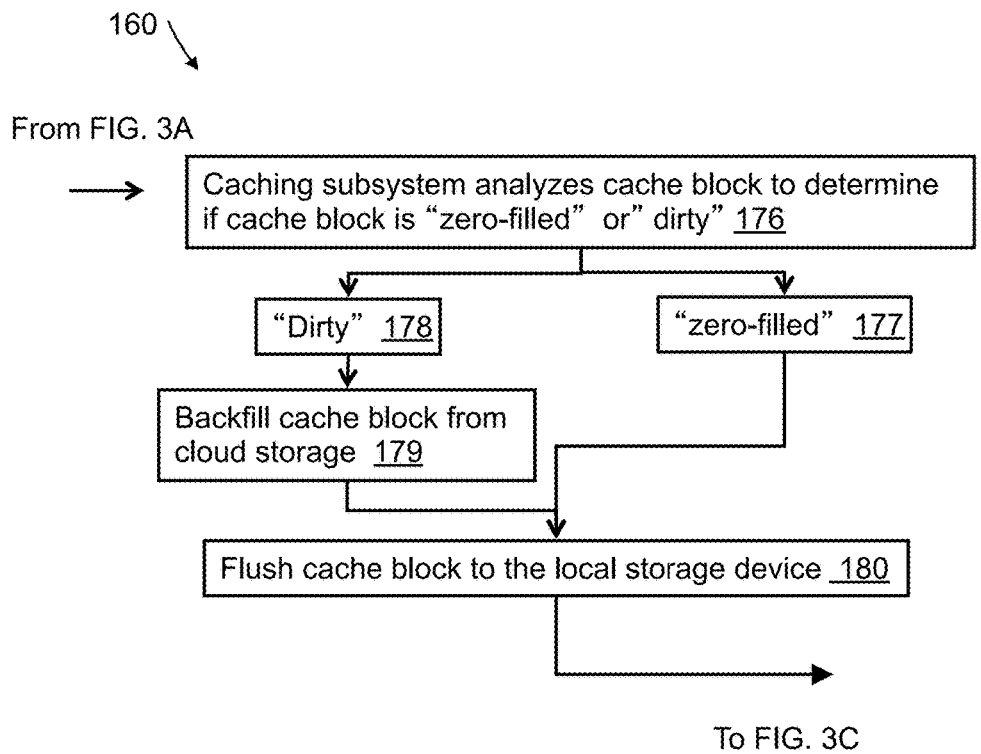
Figure 3C:
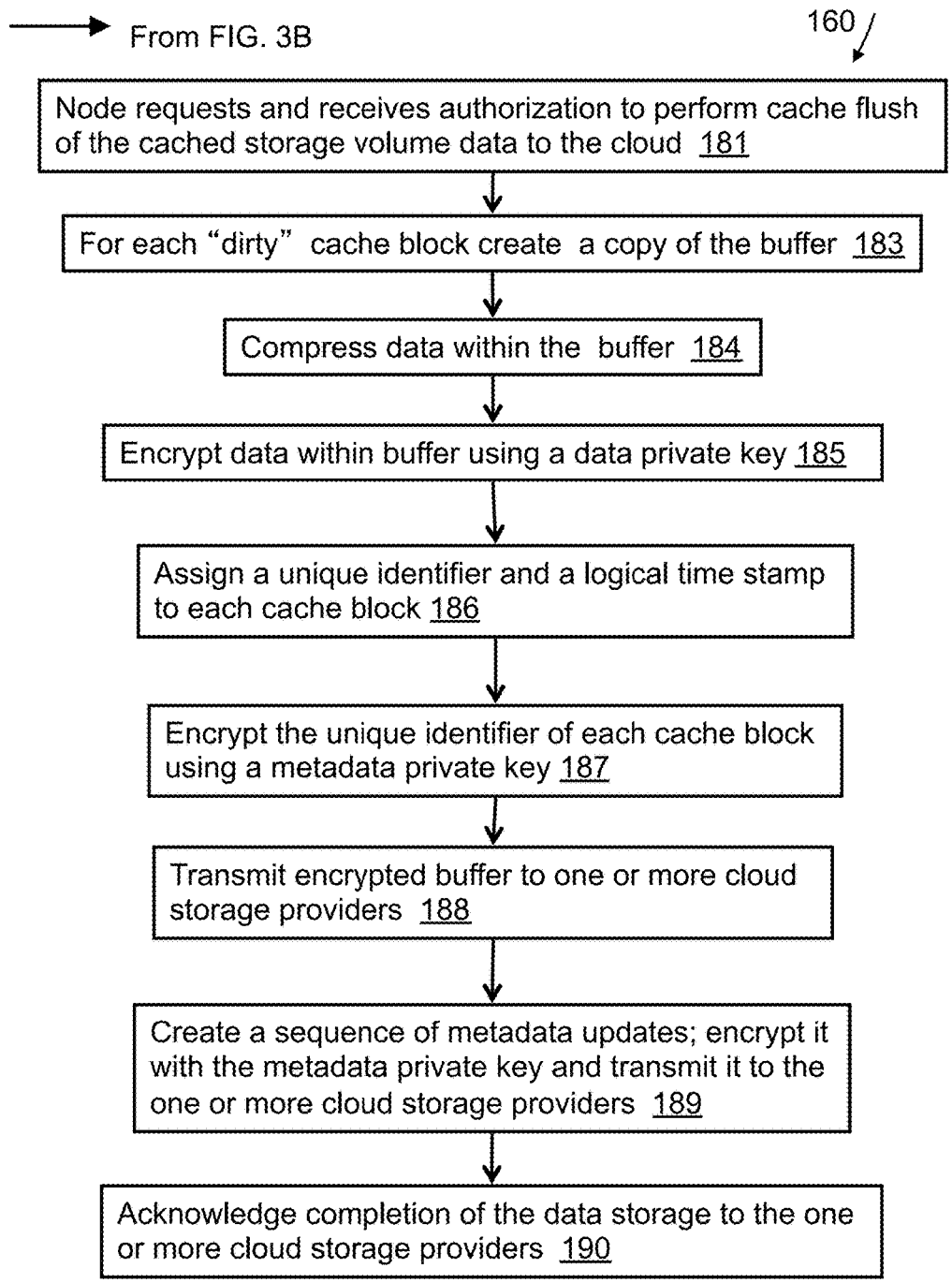

Referring to FIG. 3A, FIG. 3B and FIG. 3C, the processing 160 of an I/O request includes the following steps. In this example, the I/O is an iSCSI "write" request. In the first step, a "write" request directed to a storage volume is received from a host 103 via the iSCSI 112 (161). The Cloud Array Software (CAS) application 200 identifies the internal structure representing that storage volume by mapping the host and the storage volume identifier, and initiates processing of the host "write" request (162). Next, CAS (200) verifies that the node 102 is authorized to perform this "write" request to the identified storage volume (163). If the authorization fails (165) an error is indicated (166). Authorization may fail for a number of reasons: the node may not currently be a member of the storage cluster or the cluster may be currently partitioned, some resource necessary to the processing may be currently offline or blocked by some other node, or some other circumstance may have led to revocation of this node's authorization. If the authorization is approved (164), the "write" is passed to a caching subsystem. Next, the caching subsystem checks the node's authorization to write in the specific region of the storage volume to which the "write" is to be directed (167). In the single-node system 100 of FIG. 2A, the specific region authorization is unlikely to fail. However, in a system with multiple nodes, such as in FIG. 2B, the storage volume is partitioned into sections, with each node having direct responsibility for some subset of those sections. For different caching configuration options, such as shared versus mirrored cache, the meaning of this responsibility may differ, as will be described below. Assuming that node 103 is authorized to write to the specific region of the storage volume (168), the caching subsystem proceeds to determine if the precise extent of the "write" request is already contained within the cache 80. It performs a lookup on existing cache blocks to determine if the extent is within them (170). If the extent does not match any existing cache blocks (171), the caching subsystem attempts to allocate cache resources for the extent, either by allocating new resources or by freeing existing ones, if no more capacity is available (173). Cache blocks are allocated in very large segments, ranging from 64 kilobytes to a full megabyte, depending upon configuration choices. Once the new cache block is allocated, the write is stored in the appropriate locations in the cache block buffer. In a mirrored cache configuration, some form of consensus via a distributed algorithm such as a replicated state machine must be achieved before the write is stored in the buffer. If the extent matches an existing cache block (172), the "write" request is stored in the appropriate locations in the cache block buffer (174).

Whether the write is also immediately stored on disk in the local storage 116 is configuration dependent. A "dirty mask" structure indicating the location of the valid data in the cache buffer is simultaneously updated. Upon completion of the cache buffer updates, initial processing of the "write" request is almost completed. At this point, a flow control analysis (191) is performed to determine the amount of host I/O processing being performed, and if the rest of the system is in danger of lagging too far behind the host processing, a small amount of additional latency may be introduced. Subsequently flow control is done, if necessary, simply by pausing the response to the host for a very short period of time, and identifying and amortizing the overhead of remote transmissions over as many of the incoming requests as possible to avoid any single slowdown that could potentially cause failure or other noticeable problems. Flow control reduces and eliminates the possibility of catastrophic I/O errors on the host due to unacceptably long periods of slowdown within CAS (200).

At this point, the first stage of the CAS (200) processing of the "write" request has been completed and is returned successfully to the host (175). In the next stage, (shown in FIG. 3B) after acknowledging to the host 103, the caching subsystem is reactivated to analyze the cache block (176). If the cache block represents a block on the storage volume that has never been written to before (or which has been deleted), then the cache buffer is "zero-filled" (177). If the storage volume block has been previously written, i.e., is "dirty" the cache block must be backfilled by reading its data from an underlying cloud storage device and then the entire cache block is flushed to the local storage device (180). Assuming the cache buffer is zero-filled (177), excepting for the extent matching the dirty mask and containing the data from the previous disk, the entire cache block is then flushed to the local storage device 110 (180).

At some point during the process, a cache flush from node 102 to one or more clouds 104, 106 is scheduled. The node 102 requests and receives authorization to begin a flush of the cached storage volume data to the cloud. Each "dirty" cache block (cache blocks containing non-zero dirty masks) passes through the following series of processing steps. First, copy of the buffer is created (183), and then the data within the buffer are compressed (184) and encrypted using a data private key (symmetric) (185). Next, the cache block is assigned a unique identifier, including a logical timestamp (186), and then the cache block's unique identifier is encrypted using a metadata private key (symmetric) (187). After these steps are performed, the resulting buffer is transmitted to one or more cloud storage providers 104, 106, according to a RAID-1 replication algorithm (188). After all of the "dirty" cache blocks are processed, a further sequence of metadata updates is created, the metadata are encrypted using the metadata private key, and then the encrypted metadata are transmitted to the cloud storage providers, again according to a RAID-1 algorithm (189). The last such metadata "write" serves to atomically "activate" the flush, switching the state of the storage volume stored in the cloud to reflect the state of the volume stored in local cache at the time the flush was initiated.

Figure 4:
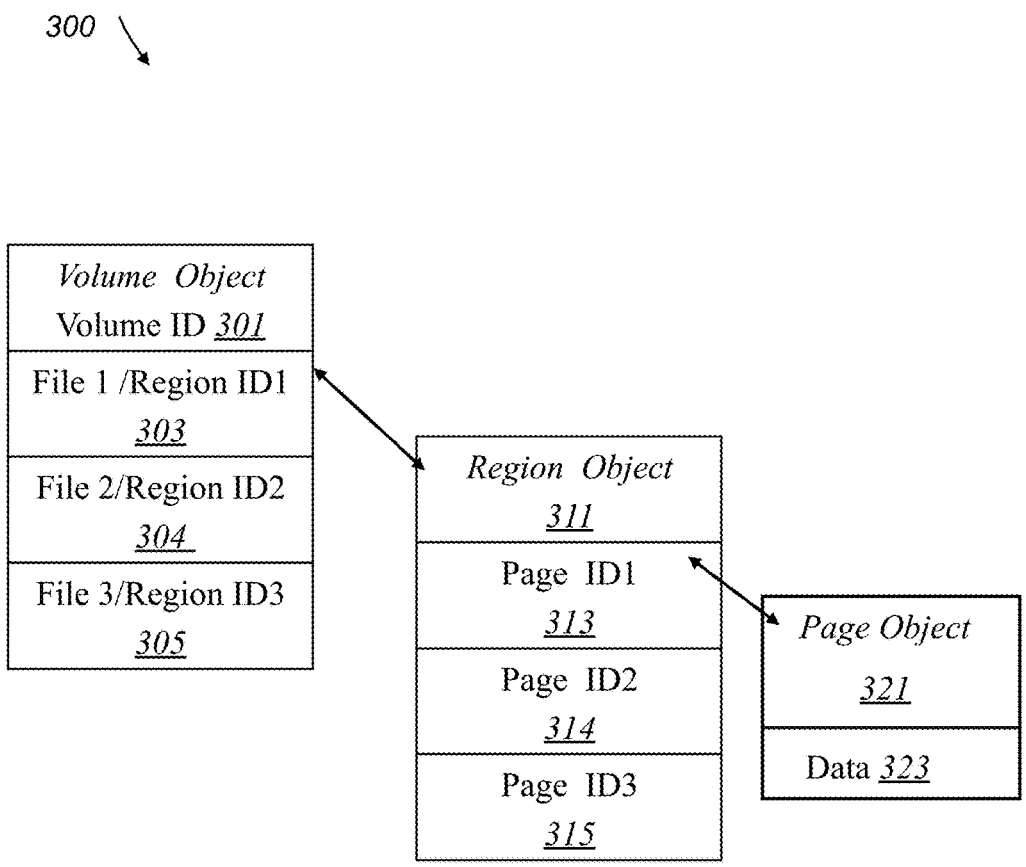
FIG. 4 is a block diagram of a data volume.

The above described cloud storage I/O request process and format used by CAS (200) to store volume data in the cloud is compatible with a "snapshot" based data backup. Referring to FIG. 4, volume 300 that is presented to a host 103 or set of hosts 103, 105 by a single CAS instance 200 is stored in the cloud in a tree structure. The nodes in the tree structure are represented by named cloud objects. Each cloud object contains either data or metadata. Leaf nodes contain strictly the volume data, while internal nodes contain lists of references to other cloud objects in the tree, as well as some extra metadata used for such things as versioning. In the example of FIG. 4, the volume object 301 and the region object 311 are the internal nodes, while the page object 321 is the leaf node where the data 323 are stored. The primary volume object having a volume ID 311 contains a set of three regions identified by region identifiers 303, 304, 306 (i.e., metadata) pointing to regions of the volume. In the example of FIG. 4, region identifier 303 points to region 311. Region 311 includes three pages identified by page identifiers 313, 314, 315. Page identifier 313 points to page 321 of the volume, which contains data 323. There is always a single volume object 301 for each CAS volume, but there are many regions and pages for each volume object. All of the region objects and page objects persist only in the cloud. The CAS 200 maintains local copies only for as long as is necessary to construct or read the data and metadata contained therein. The volume object 301 is maintained for the life of the CAS volume, but always as a shadow of the corresponding cloud object, i.e. any changes which are made by the CAS are immediately transmitted to the cloud.

Based on this method, all of the data that describe the internal structure of a volume representation is always present in the cloud. In the case of a catastrophic failure of the CAS 200, only a small amount of metadata is necessary to recover the entire contents of the volume. In the simplest case, all that is needed is the object identifier of the volume object 301. Usually, though, additional information needs to be provided in order to locate and address the volume object 301 within the appropriate cloud provider. This representation of a volume structure lends itself to using the snapshot replication model in order to perform point-in-time copies of a volume in a cloud array. Furthermore, this representation allows sharing entire volumes and the datasets contained therein across multiple disparate systems performing a wide variety of tasks, in such a way as to eliminate operational overhead between the systems. Essentially, volumes can be transferred or shared between CAS instances without either copying the data or managing access to physical or network components.

Figure 6:
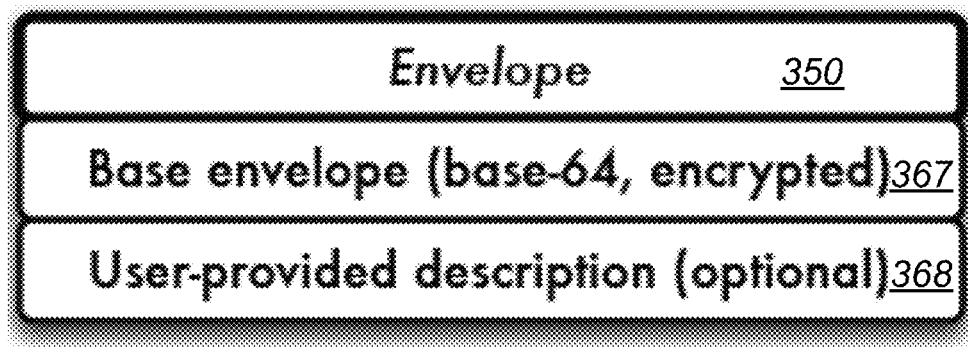
FIG. 6 is a block diagram of the basic envelope encryption structure.

In order to encapsulate the volume information, we developed a packaging mechanism, which we call a volume envelope 350, shown in FIG. 5. This envelope 350 contains all of the information necessary to retrieve the original volume object, all authentication information necessary to validate both the sender and recipient of the envelope, and all authorization information needed to dictate the "Terms of Use". Finally, the envelope is securely sealed so that none of the potentially secret information can be accessed intentionally or inadvertently by any third-party individuals who gain access to that envelope, as shown in FIG. 6.

At a minimum, the envelope contains the information necessary to access the volume object. The specifics may vary depending upon the cloud provider, but the basic framework is similar across most cloud providers. Referring to FIG. 5, basic envelope information 350 includes envelope descriptor 351, cloud provider 352, cloud access code 353, cloud user 354, cloud secret/token 355, cloud object identifier 356, information if the volume is encrypted (yes/no) 357, volume compressed (yes/no) 358, an optional structural encryption key 359, an optional data encryption key 360, epoch/generation number 361, cloud array volume identifier 362, most recent cloud array identifier 363 and user-provided description 364. Items marked with an asterisk are fields that may vary from cloud provider to provider. If the data contained within the cloud is encrypted or compressed by the CAS software 200, the envelope needs to retain that information, as well as the particular encryption keys that are used to encode and decode the data and metadata. The envelope descriptor 351 is a tag which identifies the nature and intended purpose of the envelope, e.g. shared snapshot, volume migration, or volume retention.

The recipient's behaviour and expectations about volume status differ for each of the different envelope descriptor types. Every envelope includes the epoch number 361 of the volume object at the time of envelope creation, where the epoch number is a logical timestamp which is monotonically updated when the volume is written to. In some cases, the epoch number 361 may be used to invalidate the entire envelope if there are concerns about stale data (or stale envelopes). A cloudarray volume identifier 363 provides a label for the volume, the most recent cloudarray identifier 364 establishes the claimed identity of the sender, and the user-provided description 265 allows the user to embed additional arbitrary information in the envelope. The envelope structure is composed in a self-describing manner, e.g. XML, so that an actual structure may omit optional fields, and the cloud provider access methods may be varied without modifying the contents or usage of the rest of the structure. Additionally, the ordering and size of the fields within the envelope structure can be changed.

A number of fields within the envelope structure are considered to be secret, e.g. the data encryption keys 360, structural encryption keys 359, and secret tokens 354 from the cloud providers. Therefore, base envelopes are not stored or transmitted as clear text, but instead, base envelopes are structured and encrypted, as shown in FIG. 6. A base envelope structure 350 is encrypted using a user-provided pass phrase, encoded as a base-64 structure 367, and then a user-provided description or identifier is included 367. The user-provided description 367 may or may not be the same as the user description contained within the base envelope 365.

The above described base envelope structure is only minimally secure. There are quite a few additional security concerns to be raised when transferring whole volume access between disparate systems. These concerns are centered around several questions including:

Is the recipient authorized to view the contents of the envelope?
Is the sender known to the recipient?
Is this envelope the same as the one that the sender sent?
How long is the envelope valid?
What sort of operations by the recipient are permitted upon the volume?

Figure 7:
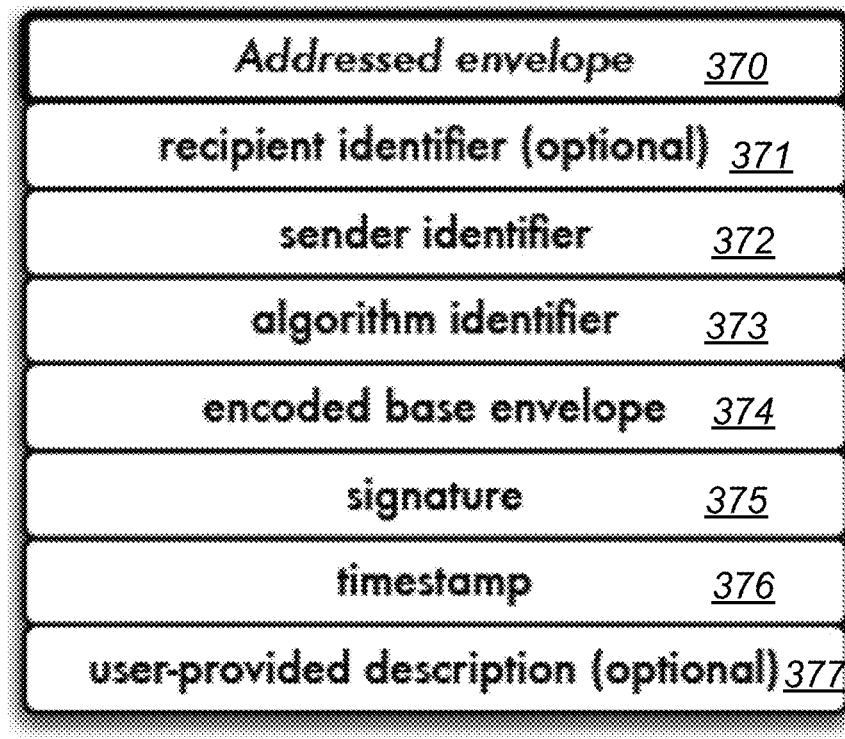
FIG. 7 is a block diagram of the addressed envelope information.

To answer these questions, some additional information must be available to both the recipient and the sender via side channels, e.g. the public keys of both must be available. Therefore, the envelope structure is extended to include additional fields, resulting in the Addressed Envelope structure 370, shown in FIG. 7. Using an addressed envelope 370, a system may encrypt the base envelope 350 using the recipient's public key 371, the sender's private key 372, and/or an optional passphrase. In order to decode the contained envelope, the recipient must be able to access its own private key, the sender's public key, and the passphrase. Any of these fields may be optional. Minimally, the envelope must be signed, although the signature need not be secured. Any user-provided description on the addressed envelope is inherently insecure and to be used for bookkeeping purposes only.

Using this pair of structures, a CAS system may encode a volume or a snapshot for transmission to another CAS system, or for archival purposes. The recipient of the envelope is restricted in its use of the encoded data: for example, a snapshot envelope requires a certain number of steps be taken in order to safely access that snapshot, and the sender must honor certain commitments regarding the lifespan of that snapshot. Additional algorithmic data may be encoded in the base snapshot to account for those commitments, e.g. an expiration date. As another example, a volume transfer/migration may require a coordination point which will record when certain phases of the migration have been achieved. The identity and specific transaction process for the migration will also need to be encoded in the base envelope.

Figure 8:
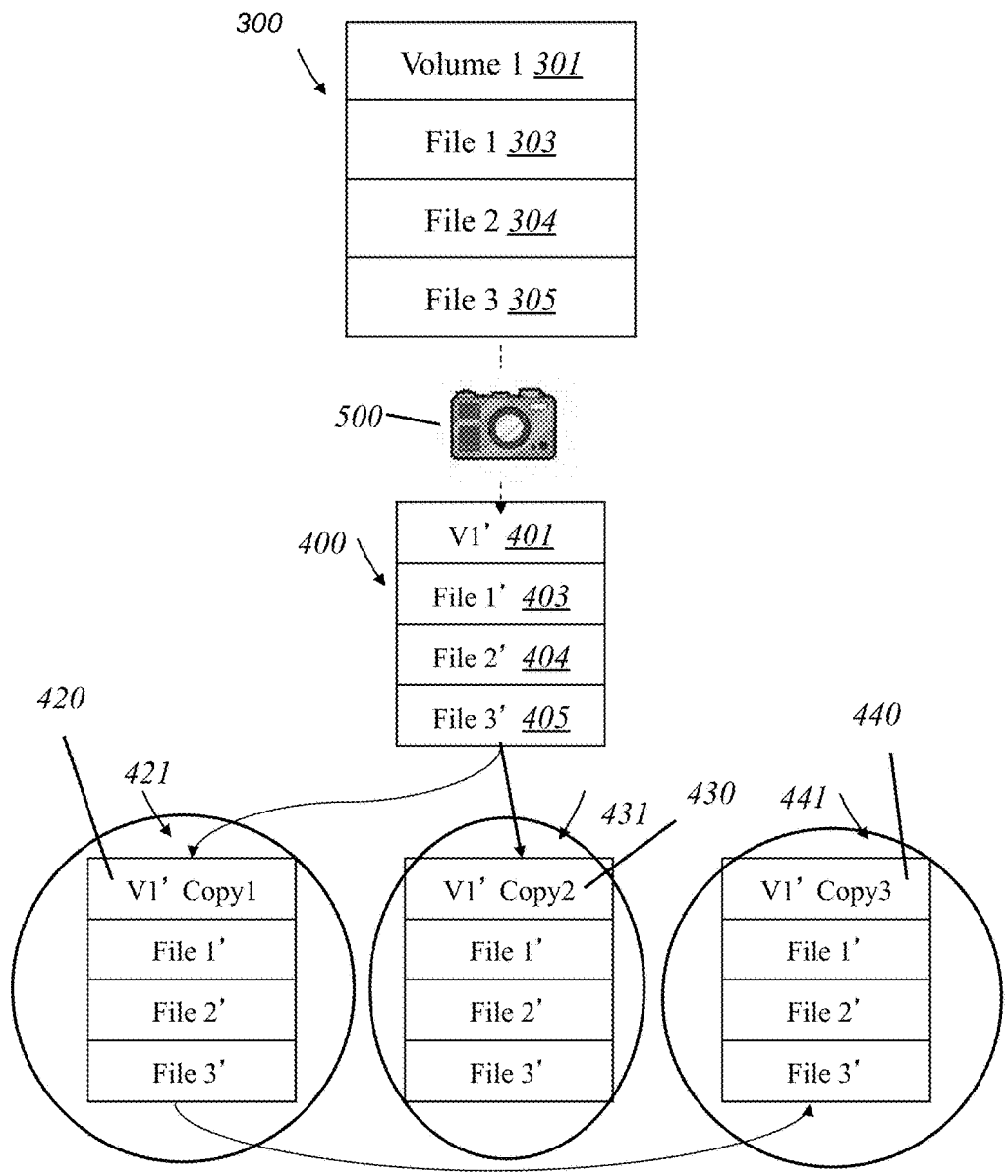
FIG. 8 depicts a block diagram of the "shared snapshot" process in a cloud array replication system.

Referring to FIG. 8, the data replication in the cloud array includes the following. CAS 200 takes a snapshot 400 of volume 300 (500) by making a copy 401 of the primary volume object 301. Copy 401 includes copies 403, 404, 405 of the regions identifiers 303, 304, 305 respectively. Next, CAS 200 copies snapshot 400 and distributes copies 420, 430 directly to cloud storage arrays 421, 431, respectively. Copies of the snapshots 400 may also be distributed from one cloud storage array to another. In the example of FIG. 8, copy 420 of snapshot 400 is distributed from cloud array 421 to cloud array 441. In each cloud array 421, 431, 441, the copies 420, 430, 440 of the snapshot 400 include the volume region identifiers, which are used to access the original volume 300 and perform read/write operations. The advantage of this "shared snapshot" method is that the copying of the original snapshot 400 and distribution of the snapshot copies from one cloud storage array to another cloud array does not spend any overhead of the original system and therefore the latency of the original system is not affected. Overhead is only incurred during the garbage collection. As was described above garbage collection as a normal CAS 200 operation involves creating a new page for every set of writes. CAS 200 checks to see if any snapshots are still using a page before removing the page object from the cloud array. This is essentially a log-structured snapshot, in which data which would normally be marked invalid are simply retained. However, since the system uses a tree-structured volume instead of a flat volume, CAS 200 can easily use the volume object of the snapshot as a basis for future read/write (I/O) operations. In this way, the volume object of the snapshot and the underlying region/data pages are stored in the cloud and CAS 200 allows multiple users/systems to access the same data, i.e., CAS provides a "shared snapshot" operation. One example of where this "shared snapshot" system can be used is distributed analysis of data. In distributed analysis of data, a large amount of data are stored in a single volume and can be shared and simultaneously analyzed by multiple users/systems. Local caches in each system can ensure uncompromised performance, since each cache operates independently.

Applications of shared resources across multi-cloud arrays include the following examples.

A. Analytics

In one common scenario, a company has a large set of data on which they wish to do some processing, e.g. customer trend analysis. Traditionally, a copy of that dataset would be made and one or more on-premise servers would be dedicated to do the extensive computational cycles, including a substantial amount of IO processing as data is retrieved from the disks, operated upon by the processor, and then the results written back out to disk. Using the CAS envelope scheme allows for a faster, cheaper model. If the large dataset is stored on a CAS system, either partially cached locally or fully replicated to a remote site, then a snapshot of that entire dataset can be easily created. An envelope containing that snapshot is created and distributed to a number of virtual CASs, which may reside in a remote compute infrastructure. Each of those CASs instantiates the enveloped snapshot and exposes it to an associated virtual server, created expressly for the purpose of performing the desired analysis. With this infrastructure in place, the problem can be solved in an entirely distributed way. Each virtual server is assigned a chunk of the large dataset to be analyzed, and automatically loads its chunk into its associated CAS instance. There is no contention in the underlying IO system, there are no spurious copies of the data, and the virtual resources can be simply removed when the computation is complete.

B. Test & Development

Within any large IT department, there is a continual push for the development and deployment of new applications and infrastructure pieces to aid in the operations of the business. This development is often expensive to develop and difficult to deploy, owing to the difficulty of testing alpha and beta code against production data and under realistic working environments. Companies may spend millions building test laboratories for their development teams and devising complex data-sharing schemes. In much the same way as a virtual analytics infrastructure is constructed, CAS can be used to create an entire replica of the production environment's data set, based on the most recent versions of production data. Envelopes containing snapshots of the volumes can be distributed to virtual CASs in the test environment, which then expose the volumes to the virtualized test environment. Rather than building out an entire permanent infrastructure to support temporary tasks, this virtualized environment can be loaded and created only when the developers require it.

C. Bulk Loading

There is a significant performance cost involved in copying a large amount of data over a wide area network. While a wide area network may be sufficient to support the ongoing transfer of working data, especially when backed by intelligent caching and flow control algorithms, the amount of data that is accumulated in a typical data set may take a prohibitive amount of time to move. That situation causes problems for a customer who wishes to use CAS with an existing data set. Envelopes provide an elegant solution. Most cloud storage services offer bulk loading services in which a physical disk is loaded with the data set, sent via overnight courier to a service location, and loaded via the provider's local network infrastructure. In this scenario, a user could create a CAS volume on a local system, encapsulate it in an envelope, and transfer it to a virtual CAS within the provider's local infrastructure. Bulk loading can then be done on the virtual CAS. Once completed, the volume can be enveloped again and transferred back to the user's local CAS system.

D. Workflow Management

In a number of different industries, large datasets have a well-defined lifecycle in which different stages of processing are performed most naturally on different servers. Envelopes can facilitate this kind of architecture, by allowing volumes to be transferred quickly to the server which is best fitted to performing the current stage's task.

E. Disaster Recovery

Envelopes are also applicable in disaster recovery applications. In disaster recovery applications large configurations of massive datasets are easily, compactly, and securely stored in multiple locations using the described envelope methodology. The datasets are re-instantiated with the help of the envelope information, in the case of an emergency.

Several embodiments of the present invention have been described. Nevertheless, it will be understood that various modifications may be made without departing from the spirit and scope of the invention. Accordingly, other embodiments are within the scope of the following claims.

What is claimed is:

1. A method for a network including a plurality of storage systems, including a local storage system and one or more cloud storage systems connected to the local storage system by an Internet connection, the method comprising:
creating a snapshot of a storage volume stored in a first location on a first storage system of the plurality of storage systems at a given point-in-time, wherein the snapshot comprises a first unique object identifier specifying at least the first location, wherein the storage volume is stored in at least one of the one or more cloud storage systems as a hierarchical tree structure of cloud objects, wherein the first unique identifier is an object identifier of a first cloud object within the hierarchical tree structure, wherein the hierarchical tree structure includes a plurality of cloud objects, including the first cloud object at the top of the hierarchy, and a plurality of other cloud objects representing portions of the storage volume, wherein the hierarchical tree structure is persisted on at least one of the one or more cloud storage systems that is not the local storage system, and wherein the method further comprises persisting on the local storage system only the first cloud object from among the plurality of cloud objects of the hierarchical tree structure, wherein the cloud objects are nodes in the tree structure; and
sharing the snapshot with at least a second storage system of the plurality of storage systems by sending at least a first copy of the snapshot to the second storage system.

2. The method of claim 1, wherein the acts of creating and sharing are controlled by a cloud storage software application operative to provide secure replication of data between the plurality of storage systems.

3. The method of claim 1, wherein at least initially the snapshot only includes metadata of the storage volume, and does not include data of the storage volume.

4. The method of claim 1, wherein the first storage system is the local storage system, and the storage volume resides on the local storage system, the method further comprising:
reserving a first region of the first storage system for one or more future write I/O requests for the storage volume.

5. The method of claim 4, further comprising:
in response to a first write I/O request of the one or more future write I/O requests, wherein the first write I/O request is for first data stored at a second location within the first location in which the first storage volume is stored, copying second data stored in the second location to a third location within the first region, and writing the first data to the second location.

6. A system for a network including a plurality of storage systems, including a local storage system and one or more cloud storage systems connected to the local storage system by an Internet connection, the system comprising:
an application module operative to control creating a snapshot of a storage volume stored in a first location on a first storage system of the plurality of storage systems at a given point-in-time, wherein the snapshot comprises a first unique object identifier specifying at least the first location, wherein the storage volume is stored in at least one of the one or more cloud storage systems as a hierarchical tree structure of cloud objects, wherein the first unique identifier is an object identifier of a first cloud object within the hierarchical tree structure, wherein the hierarchical tree structure includes a plurality of cloud objects, including the first cloud object at the top of the hierarchy, and a plurality of other cloud objects representing portions of the storage volume, wherein the hierarchical tree structure is persisted on at least one of the one or more cloud storage systems that is not the local storage system, and wherein the method further comprises persisting on the local storage system only the first cloud object from among the plurality of cloud objects of the hierarchical tree structure, wherein the cloud objects are nodes in the tree structure; and
sharing the snapshot with at least a second storage system of the plurality of storage systems by sending at least a first copy of the snapshot to the second storage system.

7. The system of claim 6, wherein the application module is a cloud storage software application operative to provide secure replication of data between the plurality of storage systems.

8. The system of claim 6, wherein at least initially the snapshot only includes metadata of the storage volume, and does not include data of the storage volume.

9. The system of claim 6, wherein the first storage system is the local storage system, and the storage volume resides on the local storage system, and
wherein the application module is further operative to control reserving a first region of the first storage system for one or more future write I/O requests for the storage volume.

10. The system of claim 9, further comprising:
wherein the application module is further operative to control, in response to a first write I/O request of the one or more future write I/O requests, wherein the first write I/O request is for first data stored at a second location within the first location in which the first storage volume is stored, copying second data stored in the second location to a third location within the first region, and writing the first data to the second location.

* * * * *